(12) United States Patent
Mori et al.

(10) Patent No.: US 10,198,367 B2
(45) Date of Patent: Feb. 5, 2019

(54) INFORMATION PROCESSING DEVICE AND METHOD FOR CONTROLLING INPUT/OUTPUT DEVICES VIA DESIGNATED FUNCTIONS

(71) Applicant: SEIKO EPSON CORPORATION, Tokyo (JP)

(72) Inventors: Yuichi Mori, Minowa-machi (JP); Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/526,090

(22) PCT Filed: Nov. 11, 2015

(86) PCT No.: PCT/JP2015/005617
§ 371 (c)(1),
(2) Date: May 11, 2017

(87) PCT Pub. No.: WO2016/079950
PCT Pub. Date: May 26, 2016

(65) Prior Publication Data
US 2017/0315938 A1    Nov. 2, 2017

(30) Foreign Application Priority Data

Nov. 17, 2014   (JP) ................................. 2014-232748

(51) Int. Cl.
*G06F 1/00*         (2006.01)
*G06F 13/10*        (2006.01)
(Continued)

(52) U.S. Cl.
CPC .......... *G06F 13/102* (2013.01); *G06F 3/0659* (2013.01); *G06F 9/445* (2013.01);
(Continued)

(58) Field of Classification Search
USPC ............................. 710/5, 300–304, 8, 10, 16
See application file for complete search history.

(56) References Cited

U.S. PATENT DOCUMENTS

| 6,189,033 B1* | 2/2001 | Jin .................... G06F 17/30902 |
| | | 707/E17.12 |
| 2006/0230077 A1* | 10/2006 | Satou .................... G06F 9/5027 |

(Continued)

FOREIGN PATENT DOCUMENTS

| JP | H11-327629 A | 11/1999 |
| JP | 2003-61163 A | 2/2003 |

(Continued)

OTHER PUBLICATIONS

Feb. 16, 2016 Search Report issued in International Patent Application No. PCT/JP2015/005617.

*Primary Examiner* — Raymond N Phan
(74) *Attorney, Agent, or Firm* — Oliff PLC

(57) ABSTRACT

To provide an information processing device that enables program development in program development for an information processing devices, in which a developer does not have to be aware of the types of input/output devices to be used. An information processing device includes a plurality of input/output devices used by a computer program for executing any processing and a main control section configured to operate, according to a request received from the computer program, the request designating functions required by the computer program, at least a part of the input/output devices associated with the functions among the plurality of input/output devices.

10 Claims, 8 Drawing Sheets

(51) Int. Cl.
  *G06F 3/06* (2006.01)
  *G06F 9/4401* (2018.01)
  *G06F 9/445* (2018.01)
  *G09G 5/00* (2006.01)
  *G02B 27/01* (2006.01)

(52) U.S. Cl.
  CPC ........... *G06F 9/4411* (2013.01); *G09G 5/006* (2013.01); *G02B 27/0172* (2013.01); *G02B 2027/0178* (2013.01); *G06F 2213/0042* (2013.01)

(56) References Cited

U.S. PATENT DOCUMENTS

| | | | | |
|---|---|---|---|---|
| 2007/0136392 A1* | 6/2007 | Oh | ...................... | G06F 9/44505 |
| 2009/0037568 A1* | 2/2009 | Bouat | .................. | H04W 84/08 |
| | | | | 709/223 |
| 2010/0331017 A1* | 12/2010 | Ariga | .................... | G01S 5/0263 |
| | | | | 455/456.3 |
| 2011/0001695 A1* | 1/2011 | Suzuki | .................... | G06F 1/163 |
| | | | | 345/156 |
| 2012/0200592 A1 | 8/2012 | Kimura | | |
| 2014/0145079 A1* | 5/2014 | Omino | ....................... | G01T 1/02 |
| | | | | 250/336.1 |
| 2014/0232620 A1* | 8/2014 | Fujigaki | ............... | G02B 27/017 |
| | | | | 345/8 |
| 2014/0240347 A1* | 8/2014 | Murakami | ........... | G02B 27/017 |
| | | | | 345/629 |
| 2014/0300532 A1* | 10/2014 | Karkkainen | ............ | G06F 3/015 |
| | | | | 345/156 |
| 2014/0375680 A1* | 12/2014 | Ackerman | ............ | G06T 19/006 |
| | | | | 345/633 |
| 2015/0084840 A1* | 3/2015 | Kim | ...................... | G02B 27/017 |
| | | | | 345/8 |
| 2015/0091781 A1* | 4/2015 | Yu | ............................ | G06F 1/163 |
| | | | | 345/8 |

FOREIGN PATENT DOCUMENTS

| | | |
|---|---|---|
| JP | 2012-163637 A | 8/2012 |
| WO | 2009/104721 A1 | 8/2009 |

\* cited by examiner

[FIG.1]
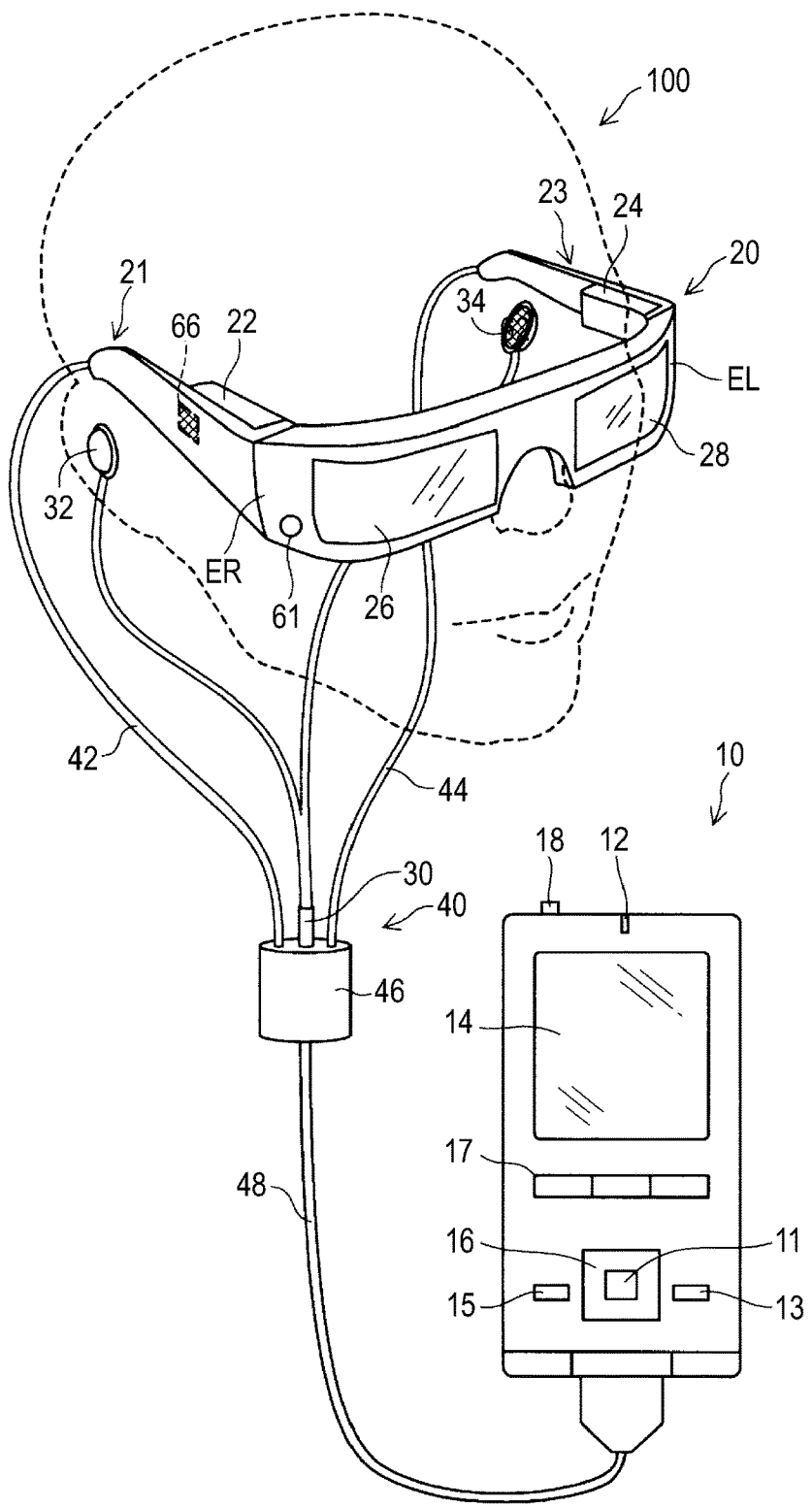

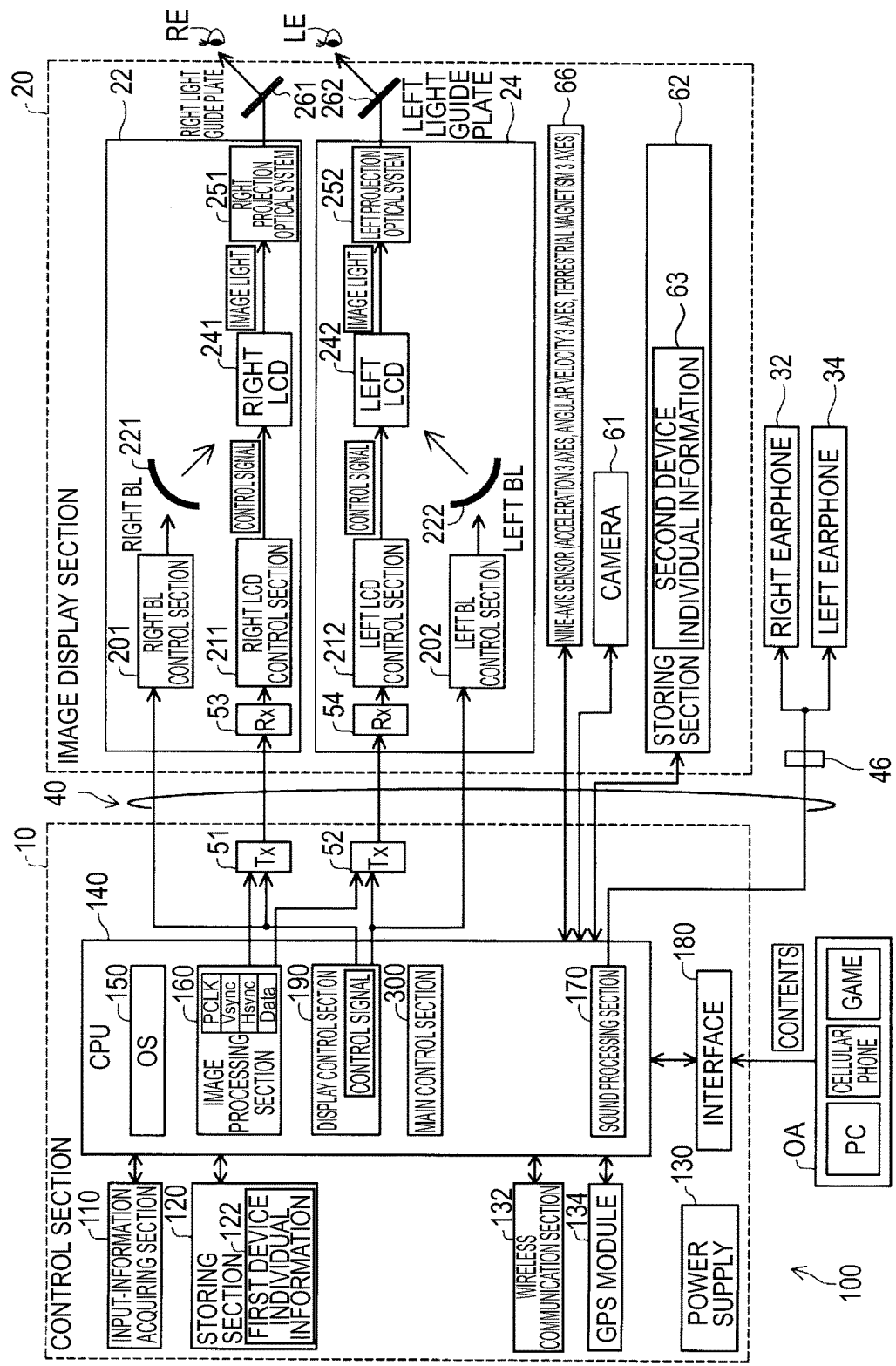
[FIG.2]

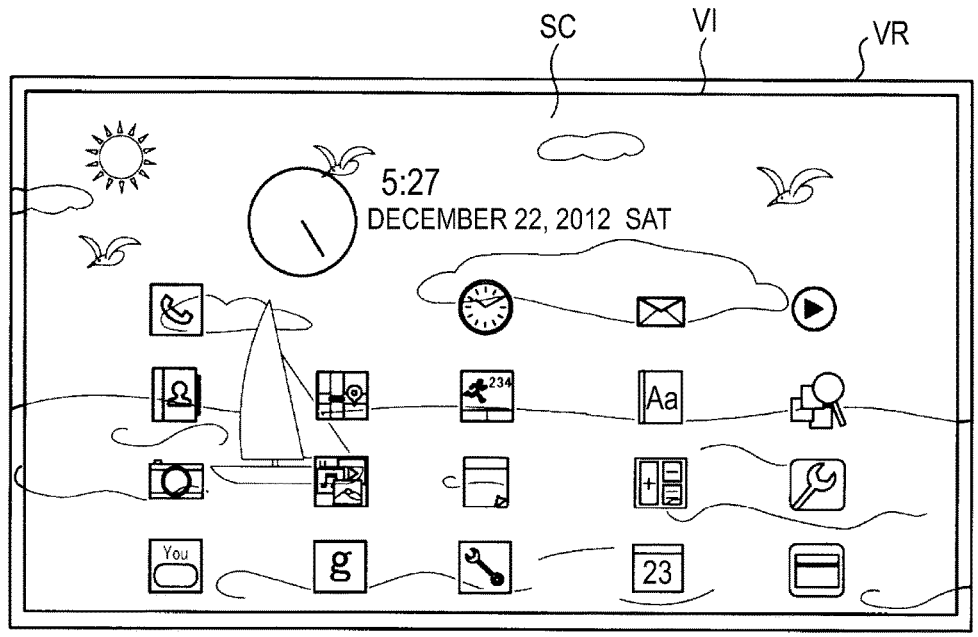

| INFORMATION CONCERNING FUNCTIONS | | INFORMATION CONCERNING INPUT-OUTPUT DEVICES | | | |
|---|---|---|---|---|---|
| TYPE | FUNCTION NAME | DEVICE ID | INTRA-MODULE DEVICE ID | TYPE | POSITION |
| SENSOR | ORIENTATION ACQUISITION | D3 | SM2 | GPS | C |
|  | IMAGE ACQUISITION | D6 | CA2 | CAMERA | C |
| UI | POINTING OPERATION | D7 | UP1 | TRACK PAD | C |
|  |  | D8 | UP2 | MOUSE | C |
|  |  | D9 | UP3 | CROSS KEY | C |
|  | CROSS KEY OPERATION | D9 | UA1 | CROSS KEY | C |
|  | MUTE OPERATION | D10 | UM1 | BUTTON | C |
|  | VOLUME OPERATION | D10 | UV1 | BUTTON | C |
|  |  | D11 | UV2 | SLIDER | C |

| INFORMATION CONCERNING FUNCTIONS | | | | INFORMATION CONCERNING INPUT-OUTPUT DEVICES | |
|---|---|---|---|---|---|
| TYPE | FUNCTION NAME | DEVICE ID | INTRA-MODULE DEVICE ID | TYPE | POSITION |
| SENSOR | ANGULAR VELOCITY ACQUISITION | D2 | SG1 | GYRO SENSOR | H |
| | | D3 | SG2 | CAMERA | H |
| | ACCELERATION ACQUISITION | D4 | SA1 | ACCELERATION SENSOR | H |
| | | D3 | SA2 | CAMERA | H |
| | ORIENTATION ACQUISITION | D5 | SM1 | TERRESTRIAL MAGNETISM SENSOR | H |
| | IMAGE ACQUISITION | D3 | CA1 | CAMERA | H |
| DISPLAY | IMAGE DISPLAY | D1 | DM1 | MONOCULAR DISPLAY | H |
| | | D1,D2 | DM2 | BINOCULAR DISPLAY | H |
| UI | CROSS KEY OPERATION | D4 | UA2 | ACCELERATION SENSOR | H |
| | | D2 | UA3 | GYRO | H |
| | MUTE OPERATION | D2 | UM2 | ACCELERATION SENSOR | H |

E21 — E22 — E23 — E24 — E25 — E27 — E28 — E29 — E30 — E31 — E32

63

[FIG.6]
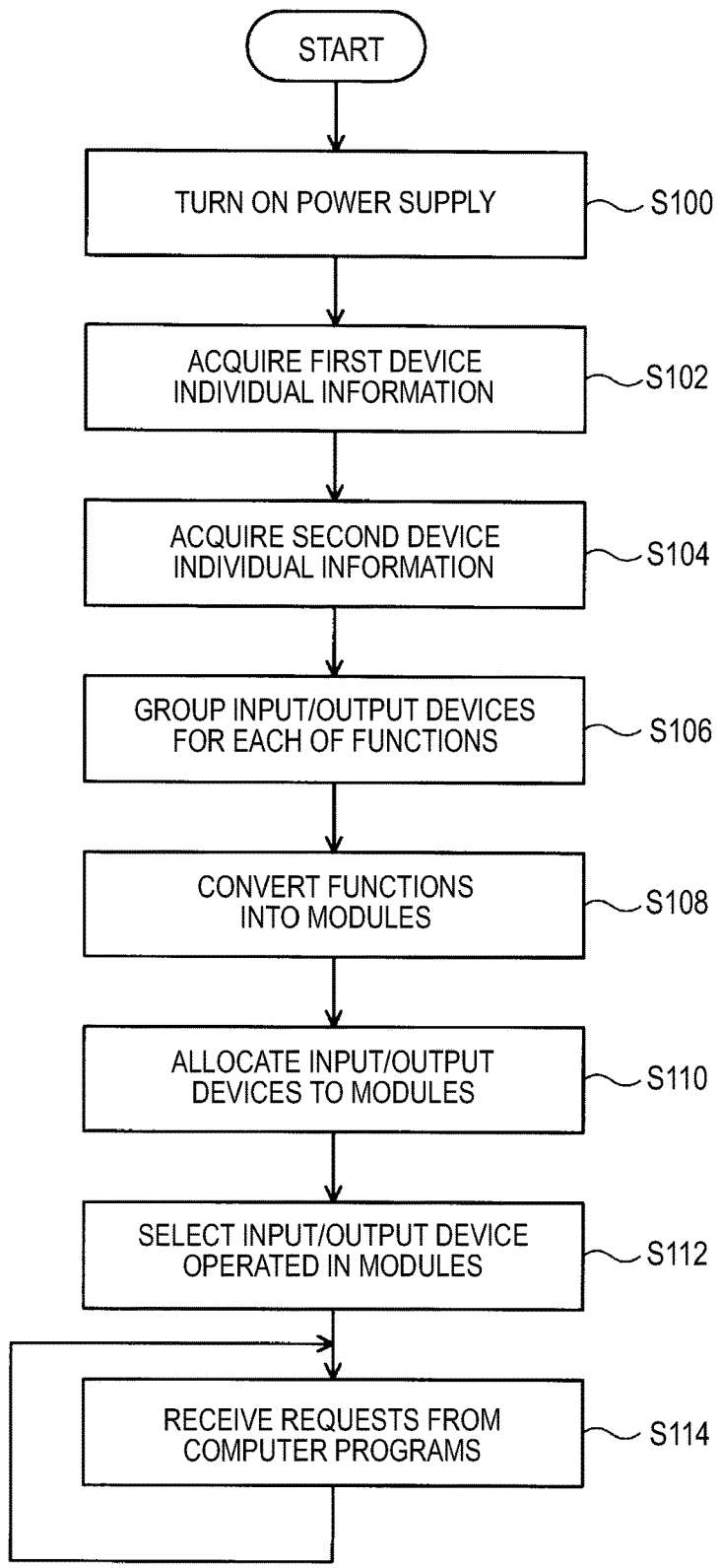

[FIG.7]

| | INFORMATION CONCERNING FUNCTIONS | | INFORMATION CONCERNING INPUT-OUTPUT DEVICES | | | |
|---|---|---|---|---|---|---|
| | TYPE | FUNCTION NAME | DEVICE ID | INTRA-MODULE DEVICE ID | TYPE | POSITION |
| G1 | SENSOR | ANGULAR VELOCITY ACQUISITION | D2 | SG1 | GYRO SENSOR | H |
| | | | D3 | SG2 | CAMERA | H |
| G2 | | ACCELERATION ACQUISITION | D4 | SA1 | ACCELERATION SENSOR | H |
| | | | D3 | SA2 | CAMERA | H |
| G3 | | ORIENTATION ACQUISITION | D5 | SM1 | TERRESTRIAL MAGNETISM SENSOR | H |
| | | | D3 | SM2 | GPS | C |
| G4 | | IMAGE ACQUISITION | D3 | CA1 | CAMERA | H |
| | | | D6 | CA2 | CAMERA | C |
| G5 | DISPLAY | IMAGE DISPLAY | D1 | DM1 | MONOCULAR DISPLAY | H |
| | | | D1,D2 | DM2 | BINOCULAR DISPLAY | H |
| G6 | UI | POINTING OPERATION | D7 | UP1 | TRACK PAD | C |
| | | | D8 | UP2 | MOUSE | C |
| | | | D9 | UP3 | CROSS KEY | C |
| G7 | | CROSS KEY OPERATION | D9 | UA1 | CROSS KEY | C |
| | | | D4 | UA2 | ACCELERATION SENSOR | H |
| | | | D2 | UA3 | GYRO | H |
| G8 | | MUTE OPERATION | D10 | UM1 | BUTTON | C |
| | | | D2 | UM2 | ACCELERATION SENSOR | H |
| G9 | | SOUND VOLUME OPERATION | D10 | UV1 | BUTTON | C |
| | | | D11 | UV2 | SLIDER | C |

[FIG.8]

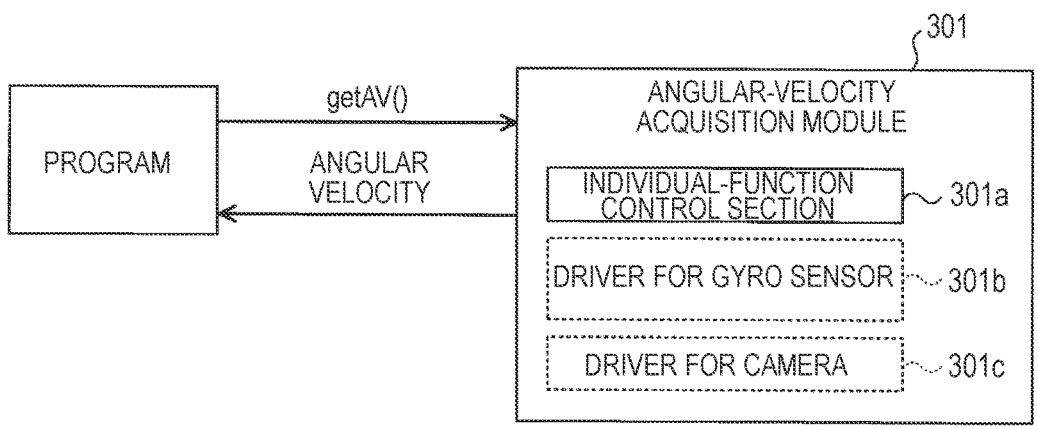

[FIG.9]

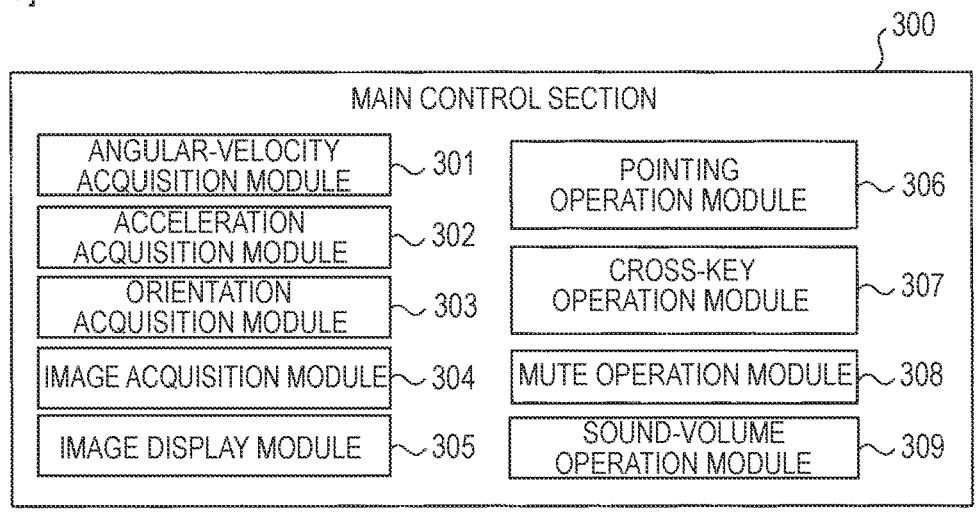

[FIG.10]

| | INFORMATION CONCERNING FUNCTIONS | | INFORMATION CONCERNING INPUT-OUTPUT DEVICES | | | |
|---|---|---|---|---|---|---|
| | TYPE | FUNCTION NAME | DEVICE ID | INTRA-MODULE DEVICE ID | TYPE | POSITION |
| G1 | SENSOR | ANGULAR VELOCITY ACQUISITION | D2 / D3 | SG1 / SG2 | GYRO SENSOR / CAMERA | H / H |
| G2 | | ACCELERATION ACQUISITION | D4 / D3 | SA1 / SA2 | ACCELERATION SENSOR / CAMERA | H / H |
| G3 | | ORIENTATION ACQUISITION | D5 / D3 | SM1 / SM2 | TERRESTRIAL MAGNETISM SENSOR / XXXXXX | H / H |
| G4 | | IMAGE ACQUISITION | D3 / D6 | CA1 / CA2 | CAMERA / CAMERA | H / C |
| G5 | DISPLAY | IMAGE DISPLAY | D1 / D1,D2 | DM1 / DM2 | MONOCULAR DISPLAY / BINOCULAR DISPLAY | H / H |
| G6 | UI | POINTING OPERATION | D7 / D8 / D9 | UP1 / UP2 / UP3 | TRACK PAD / MOUSE / CROSS KEY | C / C / C |
| G7 | | CROSS KEY OPERATION | D9 / D4 / D2 | UA1 / UA2 / UA3 | CROSS KEY / ACCELERATION SENSOR / GYRO | C / H / H |
| G8 | | MUTE OPERATION | D10 / D2 | UM1 / UM2 | BUTTON / ACCELERATION SENSOR | C / H |
| G9 | | SOUND VOLUME OPERATION | D10 / D11 | UV1 / UV2 | BUTTON / SLIDER | C / C |

[FIG.11]
(A)
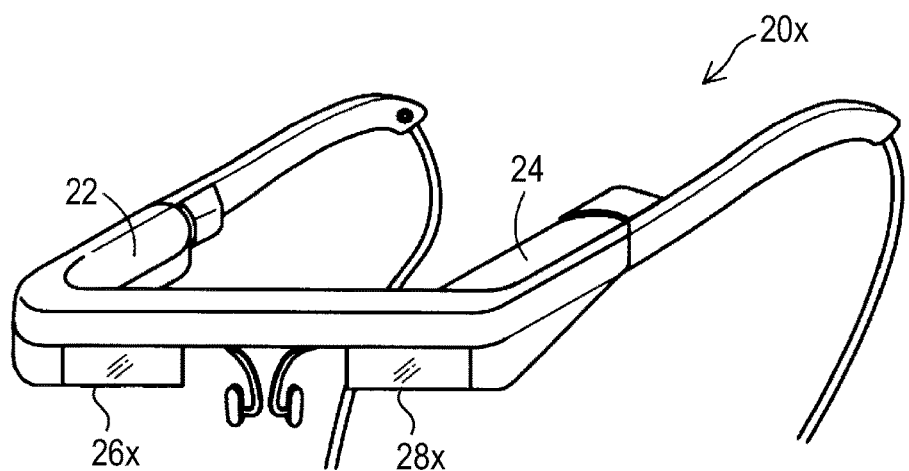
(B)
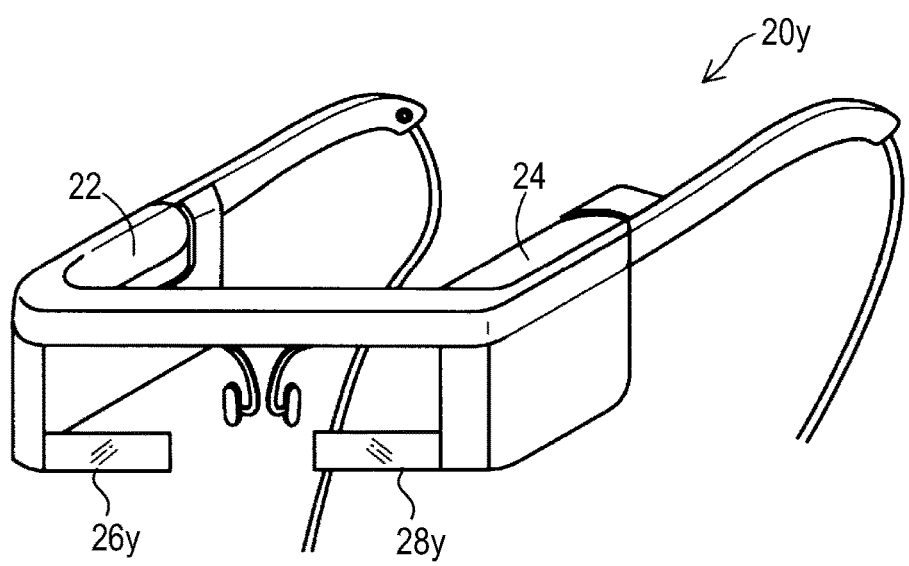

INFORMATION PROCESSING DEVICE AND METHOD FOR CONTROLLING INPUT/OUTPUT DEVICES VIA DESIGNATED FUNCTIONS

TECHNICAL FIELD

The present invention relates to an information processing device.

BACKGROUND ART

A head mounted display device (a head mounted display (HMD)), which is a display device mounted on the head, is known. For example, the HMD generates image light, which represents an image, using a liquid crystal display and a light source and guides the generated image light to the eyes of a user using projection optical systems, light guide plates, and the like to thereby cause the user to visually recognize a virtual image. PTL 1 describes a technique for generating image light in a form corresponding to individual information stored in the HMD in advance.

CITATION LIST

Patent Literature

PTL 1: JP-A-2012-163637
PTL 2: JP-A-2003-61163

SUMMARY OF INVENTION

Technical Problem

In the HMD, computer programs for executing any processing such as an operating system and application programs are installed. The computer programs execute the processing using various types of input/output devices such as an acceleration sensor, buttons, and an LCD. A developer of the computer programs decides in advance, according to functions required by processing executed by the computer programs, which types of the input/output devices are used by the computer programs. The types of the input/output devices are stored in the computer programs. That is, there has been a problem in that, during creation of the computer programs, the developer of the computer programs needs to be aware of the types of the input/output devices to be used. Such a problem is not a problem limited to the HMD and is a problem common to all information processing devices such as a personal computer and a smartphone. In the techniques described in PTL 1 and PTL 2, the problem is not taken into account.

Therefore, in program development for the information processing devices, it has been desired to provide an information processing device that enables program development in which the developer does not have to be aware of the types of the input/output devices to be used. Besides, a reduction in size, a reduction in cost, resource saving, facilitation of manufacturing, improvement of convenience of use, and the like are desired for the information processing device.

Solution to Problem

The invention has been made in order to solve at least a part of the problems described above, and the invention can be realized as the following aspects.

(1) According to an aspect of the invention, an information processing device is provided. The information processing device includes: a plurality of input/output devices used by a computer program for executing any processing; and a main control section configured to operate, according to a request received from the computer program, the request designating functions required by the computer program, at least a part of the input/output devices associated with the functions among the plurality of input/output devices. In the information processing device according to this aspect, the main control section operates, according to the request designating the functions received from the computer program, at least a part of the input/output devices associated with the designated functions among the plurality of input/output devices. Therefore, a program developer does not need to be aware of, during creation of the computer program, types of the input/output devices to be used. The program developer only has to include a request designating "functions" desired to be used. As a result, in the program development for the information processing device, it is possible to realize program development in which the program developer does not be aware of the types of the input/output devices to be used.

(2) In the information processing device according to the aspect, the main control section may perform the association by grouping the plurality of input/output devices for each of the functions required by the computer program, select at least one of the input/output devices from each of groups on the basis of a predetermined reference, and operate, according to the request, the input/output devices selected in the group. In the information processing device according to this aspect, the main control section performs the association of the functions and the input/output devices by grouping the plurality of input/output devices for each of the functions required by the computer program. The main control section operates, according to the request designating the functions received from the computer program, the input/output devices selected in the group. Therefore, the main control section can allocate the plurality of input/output devices to one function required by the computer program and operate only a part of the allocated plurality of input/output devices.

(3) The information processing device according to the aspect may further include a storing section configured to store device individual information in which information concerning the input/output devices connected to the information processing device is stored, at least function names representing contents of the functions and types of the input/output devices being stored in the device individual information in association with each other. The main control section may acquire the device individual information and carry out the grouping using the function names of the acquired device individual information. In the information processing device according to the aspect, the main control section can easily carry out the grouping of the input/output devices for each of the functions using the device individual information in which the function names representing the contents of the functions required by the computer program and the types of the input/output devices are stored in association with each other.

(4) In the information processing device according to the aspect, in the device individual information, types of the functions and information concerning positions where the input/output devices are disposed in the information processing device are stored in association with the function names. The main control section may carry out the selection on the basis of at least one of a degree of relevance between the types of the functions stored in the device individual information and the types of the input/output devices, performance of the input/output devices, priority decided in advance by a user of the information processing device, and the information concerning the positions. In the information processing device according to the aspect, the main control section can select the input/output device on the basis of the degree of relevance between the types of the functions stored in the device individual information and the types of the input/output devices. Therefore, the main control section can select the input/output devices having a higher degree of relevance to the types of the functions required by the computer program. The main control section can select the input/output devices on the basis of the performance of the input/output devices. Therefore, the main control section can select the input/output devices having higher performance. The main control section can select the input/output devices on the basis of the priority decided in advance by the user. Therefore, the main control section can select the input/output devices matching the preference of the user. The main control section can select the input/output devices on the basis of the information concerning the positions where the input/output devices are disposed in the information processing device. Therefore, the main control section can select the input/output devices having higher relevance to the types of the functions required by the computer program.

(5) In the information processing device according to the aspect, the main control section may select two or more of the input/output devices from each of the groups, operate, according to the request, the input/output device having the highest priority level in the group, and, when the operated input/output device has abnormality, operate the input/output device having the second highest priority level in the group. In the information processing device according to the aspect, the main control section selects the two or more of the input/output devices from each of the groups and operates, according to the request designating the functions received from the computer program, the input/output device having the highest priority level in the group. When the input/output device operated first has abnormality, the main control section operates the input/output device having the second highest priority level in the group. Therefore, even if a certain input/output device has abnormality, the main control section can respond to the request from the computer program using another input/output device. As a result, it is possible to improve availability of the information processing device.

(6) In the information processing device according to the aspect, the main control section may execute the selection and the operation after grouping, for each of the functions required by the computer program, a plurality of input/output devices included in another information processing device connected to the information processing device together with the plurality of input/output devices of the information processing device to perform the association. In the information processing device according to this aspect, the main control section can operate, according to the request designating the functions received from the computer program, the input/output devices included in the other information processing device connected to the information processing device in addition to the input/output devices of the information processing device.

(7) In the information processing device according to the aspect, the main control section may limit a target of the grouping to the input/output devices that are in an active state. In the information processing device according to the aspect, the main control section limits the target of the grouping to the input/output devices that are in the active state. Therefore, it is possible to suppress a delay of processing.

(8) In the information processing device according to the aspect, the request designating the functions may be at least any one of a mathematical function including the designation of the functions, a procedure including the designation of the functions, and a command including the designation of the functions. In the information processing device according to the aspect, the main control section can operate the input/output devices according to the request by at least any one of the mathematical function, the procedure, and the command, which are means generally used in the computer program. As a result, it is possible to improve convenience in the program developer.

Not all of the plurality of constituent elements of the aspects of the invention explained above are essential. To solve a part or all of the problems or to achieve a part or all of the effects described in this specification, concerning apart of the plurality of constituent elements, it is possible to appropriately perform a change, deletion, replacement with new other constituent elements, and partial deletion of limited contents. To solve a part or all of the problems or to achieve a part or all of the effects described in this specification, it is also possible to combine a part or all of the technical features included in one aspect of the invention explained above with a part or all of the technical features included in the other aspects of the invention explained above to obtain one independent aspect of the invention.

For example, one aspect of the invention can be realized as a device including a part or all of the two elements, that is, the plurality of input/output devices and the main control section. That is, the device may or may not include the plurality of input/output devices. The device may or may not include the main control section. The device can be realized as, for example, an information processing device but can be realized as devices other than the information processing device as well. A part or all of technical features of the information processing device according to the aspects can be applied to the device.

Note that the invention can also be realized in various forms. The invention can be realized in forms of, for example, an information processing device and a control method for the information processing device, an information processing system including the information processing device, a head-mounted display device and a control method for the head-mounted display device, an image display system including the head-mounted display device, a computer program for realizing functions of the methods, the devices, and the systems, and a recording medium having the computer program recorded therein.

BRIEF DESCRIPTION OF DRAWINGS

FIG. 1 is an explanatory diagram showing a schematic configuration of an information processing device in an embodiment of the invention.

FIG. 2 is a block diagram showing a functional configuration of an HMD 100 functioning as the information processing device.

FIG. 3 is an explanatory diagram showing an example of a virtual image visually recognized by a user.

FIG. 4 is an explanatory diagram showing an example of first device individual information.

FIG. 5 is an explanatory diagram showing an example of second device individual information.

FIG. 6 is a flowchart for explaining a procedure of black-boxing processing.

FIG. 7 shows an example of grouping individual information GI.

FIG. 8 is an explanatory diagram for explaining a module.

FIG. 9 shows an example of functions converted into modules.

FIG. 10 shows a state in which one input/output device operated in each of the modules is selected.

FIGS. 11A and 11B are explanatory diagrams showing exterior configurations of HMDs in a modification.

DESCRIPTION OF EMBODIMENTS

A. Embodiment
A-1. Configuration of an Information Processing Device

FIG. 1 is an explanatory diagram showing a schematic configuration of an information processing device in an embodiment of the invention. An information processing device 100 in this embodiment is a head-mounted display device mounted on the head and is called head mounted display (HMD) as well. The HMD 100 is an optical see-through head mounted display with which a user can visually recognize a virtual image and, at the same time, directly visually recognize an outside scene. The HMD 100 in this embodiment includes a main control section for converting input/output devices of the HMD 100 into black boxes with respect to a computer program installed in the HMD 100. Specifically, the main control section operates, according to a request received from the computer program installed in the HMD 100, the request designating functions required by the computer program, at least a part of input/output devices associated with the requested functions among a plurality of input/output devices connected to the HMD 100. The "functions" mean roles realized by the input/output devices connected to the HMD 100. Examples of the "functions" include a cross-key operation function, a sound-volume operation function, an image display function, an acceleration acquiring function, and an angular-velocity acquiring function.

The HMD 100 includes an image display section 20 that causes a user to visually recognize a virtual image in a state in which the image display section 20 is worn on the head of the user and a control section (a controller) 10 that controls the image display section 20. Note that, in the following explanation, the virtual image that the user visually recognizes with the HMD 100 is referred to as "display image" as well for convenience. The HMD 100 emitting image light generated on the basis of image data by the HMD 100 is referred to as "display an image" as well.

A-1-1. Configuration of the Image Display Section

FIG. 2 is a block diagram showing a functional configuration of the HMD 100 functioning as the information processing device. As shown in FIG. 1, the image display section 20 is a wearing body worn on the head of the user. In this embodiment, the image display section 20 has an eyeglass shape. The image display section 20 includes a right holding section 21, a right display driving section 22, a left holding section 23, a left display driving section 24, a right optical-image display section 26, a left optical-image display section 28, a camera 61, a nine-axis sensor 66, and a storing section 62. A positional relation and functions of the sections of the image display section 20 in a state in which the user wears the image display section 20 are explained below.

As shown in FIG. 1, the right optical-image display section 26 and the left optical-image display section 28 are disposed to be respectively located in front of the right eye and in front of the left eye of the user. One end of the right optical-image display section 26 and one end of the left optical-image display section 28 are connected to each other in a position corresponding to the middle of the forehead of the user. As shown in FIG. 2, the right optical-image display section 26 includes a right light guide plate 261 and a dimming plate (not shown in the figure). The right light guide plate 261 is formed of light-transmissive resin material or the like. The right light guide plate 261 guides image light output from the right display driving section 22 to a right eye RE of the user while reflecting the image light along a predetermined optical path. The dimming plate is a thin plate-like optical device and is disposed to cover the front side of the image display section 20 (the opposite side of the side of the eyes of the user). The dimming plate protects the light guide plate 261 and suppresses, for example, damage and adhesion of stain to the light guide plate 261. By adjusting the light transmittance of the dimming plate, it is possible to adjust an amount of external light made incident on the eyes of the user and adjust easiness of visual recognition of a virtual image. Note that the dimming plate can be omitted.

The left optical-image display section 28 includes a left light guide plate 262 and a dimming plate (not shown in the figure). Details of the left light guide plate 262 and the dimming plate are the same as those in the right optical image display section 26. Note that the right optical-image display section 26 and the left optical-image display section 28 are collectively simply referred to as "optical-image display section" as well. The optical-image display section can use any system as long as the optical-image display section forms a virtual image in front of the eyes of the user using image light. For example, the optical-image display section may be realized using a diffraction grating or may be realized using a semi-transmissive reflection film.

As shown in FIG. 1, the right holding section 21 is provided to extend from an end portion ER of the right optical-image display section 26 to a position corresponding to the right temporal region of the user. The left holding section 23 is provided to extend from an end portion EL of the left optical-image display section 28 to a position corresponding to the left temporal region of the user. The right holding section 21 and the left holding section 23 hold the image display section 20 on the head of the user like temples of eyeglasses. Note that the right holding section 21 and the left holding section 23 are collectively simply referred to as "holding section" as well.

As shown in FIG. 1, the right display driving section 22 is disposed on the inner side (a side opposed to the head of the user) of the right holding section 21. The left display driving section 24 is disposed on the inner side of the left holding section 23. As shown in FIG. 2, the right display driving section 22 includes a receiving section (Rx) 53, aright backlight (BL) control section 201 and a right backlight (BL) 221 functioning as a light source, a right LCD (Liquid Crystal Display) control section 211 and a right LCD 241 functioning as a display element, and a right projection optical system 251. Note that the right backlight control section 201, the right LCD control section 211, the right backlight 221, and the right LCD 241 are collectively referred to as "image-light generating section" as well. The receiving section 53 functions as a receiver for serial transmission between the control section 10 and the image display section 20. The right backlight control section 201 drives the right backlight 221 on the basis of an input control signal. The right backlight 221 is, for example, a light emitting body such as an LED (Light Emitting Diode) or an electroluminescence (EL) element. The right LCD control section 211 drives the right LCD 241 on the basis of a clock signal PCLK, a vertical synchronization signal VSync, a horizontal synchronization signal HSync, and image data for right eye Data1 input via the receiving section 53. The right LCD 241 is a transmissive liquid crystal panel on which a plurality of pixels are arranged in a matrix shape. The right projection optical system 251 is a collimate lens that changes the image light emitted from the right LCD 241 to light beams in a parallel state.

The left display driving section 24 includes a receiving section (Rx) 54, a left backlight (BL) control section 202 and a left backlight (BL) 222 functioning as a light source, a left LCD control section 212 and a left LCD 242 functioning as a display element, and a left projection optical system 252. Details of these sections are the same as those of the right display driving section 22. Note that the right display driving section 22 and the left display driving section 24 are collectively simply referred to as "display driving section" as well.

The camera 61 is disposed in a position corresponding to the corner of the eye on the right side of the user. The camera 61 picks up an image of an outside scene (a scene on the outside) in the front side direction of the image display section 20, in other words, in a visual field direction of the user in a state in which the head mounted display 100 is mounted and acquires an outside scene image. The camera 61 is a so-called visible light camera. The outside scene image acquired by the camera 61 is an image representing the shape of an object from visible light radiated from the object. Although the camera 61 in this embodiment is a monocular camera, the camera 61 may be a stereo camera.

The nine-axis sensor 66 is disposed in a position corresponding to the temple on the right side of the user. The nine-axis sensor 66 is a motion sensor that detects acceleration (three axes), angular velocity (three axes), and terrestrial magnetism (three axes). Since the nine-axis sensor 66 is provided in the image display section 20, when the image display section 20 is worn on the head of the user, the nine-axis sensor 66 functions as a "motion detecting section" that detects the motion of the head. The motion of the head includes the speed, the acceleration, the angular velocity, the direction, and a change in the direction of the head.

The storing section 62 is configured by a ROM, a RAM, a DRAM, a hard disk, and the like. In the storing section 62, second device individual information 63 is stored in advance. In the second device individual information 63, information concerning input/output devices connected to the image display section 20 is stored. The "input/output devices connected to the image display section 20" include both of a (so-called incorporated) input/output device internally connected to a circuit board of the image display section 20 and a (so-called external) input/output device externally connected to the image display section 20. A connection method in the incorporated and external input/output devices may be either wired connection or wireless connection. Details of the second device individual information 63 are explained below.

As shown in FIG. 1, the image display section 20 includes a connecting section 40 for connecting the image display section 20 and the control section 10. The connecting section 40 includes a main body cord 48 connected to the control section 10, a right cord 42 and a left cord 44 branching from the main body cord 48, and a coupling member 46 provided at a branch point. The right cord 42 is connected to the right display driving section 22. The left cord 44 is connected to the left display driving section 24. A jack for connecting an earphone plug 30 is provided in the coupling member 46. A right earphone 32 and a left earphone 34 extend from the earphone plug 30. A connector (not shown in the FIGURE) is provided at the end portion on the opposite side of the coupling member 46 in the main body cord 48. The connector realizes connection and disconnection of the control section 10 and the image display section 20 according to fitting and unfitting with a connector (not shown in the figure) provided in the control section 10. The image display section 20 and the control section 10 perform transmission of various signals via the connecting section 40. As the right cord 42, the left cord 44, and the main body cord 48, for example, a metal cable and an optical fiber can be adopted.

A-1-2. Configuration of the Control Section

As shown in FIG. 1, the control section 10 is a device for controlling the HMD 100. The control section 10 includes a determination key 11, a lighting section 12, a display switching key 13, a track pad 14, a luminance switching key 15, a direction key 16, a menu key 17, and a power switch 18. The determination key 11 detects pressing operation and outputs a signal for determining content of operation in the control section 10. The lighting section 12 is realized by, for example, an LED and notifies, with a light emission state thereof, an operation state of the HMD 100 (e.g., ON/OFF of a power supply). The display switching key 13 detects pressing operation and outputs, for example, a signal for switching a display mode of a content moving image to 3D and 2D. The track pad 14 detects operation of a finger of the user on an operation surface of the track pad 14 and outputs a signal corresponding to detected content. As the track pad 14, various types such as an electrostatic type, a pressure detection type, and an optical type can be adopted. The luminance switching key 15 detects pressing operation and outputs a signal for increasing and reducing the luminance of the image display section 20. The direction key 16 detects pressing operation on keys corresponding to upward, downward, left, and right directions and outputs a signal corresponding to detected content. The power switch 18 detects slide operation of the switch to switch a state of the power supply of the HMD 100.

As shown in FIG. 2, the control section 10 includes an input-information acquiring section 110, a storing section 120, a power supply 130, a wireless communication section 132, a GPS module 134, a CPU 140, an interface 180, and transmitting sections (Txs) 51 and 51. The sections are connected to one another by a not-shown bus.

The input-information acquiring section 110 acquires, for example, signals corresponding to operation inputs to the determination key 11, the display switching key 13, the track pad 14, the luminance switching key 15, the direction key 16, the menu key 17, and the power switch 18. The input-information acquiring section 110 can acquire operation inputs performed using various methods other than the method explained above. For example, the input-information acquiring section 110 may acquire an operation input by a footswitch (a switch operated by a foot of the user). For example, the input-information acquiring section 110 may acquire an operation input by a command associated with a line of sight or a movement of the eyes of the user detected by a line-of-sight detecting section. The command may be set to be able to be added by the user. For example, the input-information acquiring section 110 may detect a gesture of the user using a camera that photographs an image in the visual field direction of the user and acquire an operation input by a command associated with the gesture. In the gesture detection, a fingertip of the user, a ring worn on a hand of the user, a medical instrument held by the user, and the like can be used as a mark for movement detection. If the operation input by the footswitch or the line of sight can be acquired, even in work in which it is difficult for the user to release the hands, the input-information acquiring section 110 can acquire the operation input from the user.

The storing section 120 is configured by a ROM, a RAM, a DRAM, a hard disk, and the like. In the storing section 120, various computer programs such as an operating system (OS) are stored. In the storing section 120, first device individual information 122 is stored in advance. In the first device individual information 122, information concerning input/output devices connected to the control section 10 is stored. The "input/output devices connected to the control section 10" include both of an input/output device internally connected to a circuit board of the control section 10 and an input/output device externally connected to the control section 10. A connection method in the incorporated and external input/output devices may be either wired connection or wireless connection. Details of the first device individual information 122 are explained below.

The power supply 130 supplies electric power to the sections of the HMD 100. As the power supply 130, for example, a secondary battery can be used.

The wireless communication section 132 performs wireless communication with an external apparatus according to a predetermined wireless communication standard. The predetermined wireless communication standard is, for example, a short-range wireless communication exemplified by an infrared ray or Bluetooth (registered trademark) or a wireless LAN exemplified by IEEE802.11.

The GPS module 134 receives a signal from a GPS satellite to thereby detect the present position of the user of the HMD 100 and generates present position information representing the present position of the user. The present position information can be realized by, for example, a coordinate representing latitude and longitude.

The CPU 140 reads out and executes computer programs stored in the storing section 120 to thereby function as a main control section 300, an OS 150, an image processing section 160, a sound processing section 170, and a display control section 190.

The main control section 300 executes processing for converting the input/output devices of the HMD 100 into black boxes (hereinafter referred to as "black-boxing processing" as well) with respect to computer programs installed in the HMD 100. The computer programs installed in the HMD 100 include a computer program for realizing a function of the OS 150, a computer program for realizing a function of the image processing section 160, a computer program for realizing a function of the sound processing section 170, a computer program for realizing a function of the display control section 190, and various application programs other than the application programs stored in the storing section 120.

The image processing section 160 generates a signal on the basis of contents (videos) input via the interface 180 and the radio communication section 132. For example, when the contents are in a digital format, the image processing section 160 generates a clock signal PCLK, a vertical synchronization signal VSync, a horizontal synchronization signal HSync, and image data Data. Note that, when the contents are in a digital format, the clock signal PCLK is output in synchronization with an image signal. Therefore, the generation of the vertical synchronization signal VSync and the horizontal synchronization signal HSync and A/D conversion of an analog image signal are unnecessary. The image processing section 160 transmits the clock signal PCLK, the vertical synchronization signal VSync, and the horizontal synchronization signal HSync generated by the image processing section 160 and the image data Data stored in the DRAM in the storing section 120 to the image display section 20 via the transmitting sections 51 and 52. The image data Data transmitted via the transmitting section 51 is referred to as "image data for right eye Data1" as well. The image data Data transmitted via the transmitting section 52 is referred to as "image data for left eye Data2" as well. Note that the image processing section 160 may execute, on the image data Data stored in the storing section 120, image processing such as resolution conversion processing, various kinds of tone correction processing such as adjustment of luminance and chroma, and keystone correction processing.

The display control section 190 generates control signals for controlling the right display driving section 22 and the left display driving section 24. Specifically, the display control section 190 individually controls, with control signals, ON/OFF of driving of the left and right LCDs 241 and 242 by the left and right LCD control sections 211 and 212 and ON/OFF of driving of the left and right backlights 221 and 222 by the left and right backlight control sections 201 and 202 to thereby control generation and emission of image lights respectively by the right display driving section 22 and the left display driving section 24. The display control section 190 transmits the control signals to the image display section 20 via the transmitting sections 51 and 52.

The sound processing section 170 acquires a sound signal included in the contents, amplifies the acquired sound signal, and supplies the sound signal to a not-shown speaker of the right earphone 32 and a not-shown speaker of the left earphone 34.

The interface 180 performs communication with an external apparatus OA according to a predetermined wired communication standard. The predetermined wired communication standard is, for example, Micro USB (Universal Serial Bus), USB, HDMI (registered trademark) (High Definition Multimedia Interface), DVI (Digital Visual Interface), VGA (Video Graphics Array), composite, RS-232C (Recommended Standard 232), or wired LAN exemplified by IEEE802.3. As the external apparatus OA, for example, a personal computer PC, a cellular phone terminal, and a game terminal can be used.

FIG. 3 is an explanatory diagram showing an example of a virtual image visually recognized by the user. The image lights guided to both the eyes of the user of the HMD 100 are focused on the retinas of the user as explained above, whereby the user visually recognizes a virtual image VI. In the example shown in figure, the virtual image VI is a standby screen of the OS 150 of the HMD 100. The user visually recognizes an outside scene SC through the right optical-image display section 26 and the left-optical image display section 28. In this way, in a portion where the virtual image VI is displayed in a visual field VR, the user of the HMD 100 in this embodiment can view the virtual image VI and the outside scene SC behind the virtual image VI. In a portion where the virtual image VI is not displayed in the visual field VR, the user can directly view the outside scene SC through the optical-image display sections.

A-2. Device Individual Information

FIG. 4 is an explanatory diagram showing an example of the first device individual information. In the first device individual information 122, information concerning the input/output devices connected to the control section 10 (FIG. 2) is stored in advance. In the first device individual information 122, information concerning functions and information concerning input/output devices are stored in association with each other.

The "information concerning functions" is information concerning functions (i.e., roles realized by the input/output devices). The information concerning functions includes a type and a function name. The "type" indicates names representing types of the functions, in other words, names representing rough classifications of the functions. The "function name" indicates names representing actual contents of the functions.

The "information concerning input/output devices" is information concerning the input/output devices connected to the control section 10 of the HMD 100. The information concerning input/output devices includes a device ID, an intra-module device ID, a type, and a position. The "device ID" indicates identifiers assigned to the input/output devices in order to identify the input/output devices from one another. The "intra-module device ID" indicates identifiers assigned to the input/output devices in order to identify combinations of functions (function names) and input/output devices (device IDs) from one another. The "type" indicates names representing types of the input/output devices, in other words, names representing what kinds of work the input/output devices perform. The "position" indicates signs representing places to which the input/output devices are connected. In this embodiment, when "C" is stored in the position, this means that the input/output devices are connected to the control section 10. When "H" is stored in the position this means that the input/output devices are connected to the image display section 20. The first device individual information 122 is information concerning the input/output devices connected to the control section 10. Therefore, in the position, "C" is stored for all the input/output devices. Note that, in a field of the position, the input/output device incorporated in the control section 10 and the input/output device externally attached to the control section 10 may be distinguished. For example, a value of the input/output device incorporated in the control section 10 can be represented as "CI" and a value of the input/output device externally attached to the control section 10 can be represented as "CO".

For example, in an example in an entry E10, it is seen that a "GPS" identified by a device ID "D3 " and connected to the control section 10 can be used to realize an "orientation acquisition" function. It is seen that an intra-module device ID "SM2" is assigned to the "GPS" having the device ID "D3" that has the "orientation acquisition" function. In an example of an entry E11, it is seen that a "camera" identified by a device ID "D6" and connected to the control section 10 can be used to realize an "image acquisition" function. It is seen that an intra-module device ID "CA2" is assigned to the "camera" having the device ID "D6" that performs the "image acquisition" function. For example, it is seen that, in examples of entries E16 and E17, it is seen that a "button" identified by a device ID "D10" and connected to the control section 10 can be used to realize a "mute operation" function and a "sound volume operation" function. It is seen that an intra-module device ID "UM1" is assigned to the "button" having the device ID "D10" that has the "mute operation" function. On the other hand, it is seen that an intra-module device ID "UV1" is assigned to the "button" having the device ID "D10" that has the "sound volume operation" function. As in this button, one input/output device can perform a plurality of functions.

FIG. 5 is an explanatory diagram showing an example of the second device individual information. In the second device individual information 63, information concerning the input/output devices connected to the image display section 20 (FIG. 2) is stored in advance. In the second device individual information 63, as in the first device individual information 122, information concerning functions and information concerning input/output devices are stored in association with each other. Details of the "information concerning functions" and details of the "information concerning input/output devices" are the same as those in the first device individual information 122. Note that, in a field of a position, the input/output device incorporated in the image display section 20 and the input/output device externally attached to the image display section 20 may be distinguished. In this case, for example, a value of the input/output device incorporated in the image display section 20 can be represented as "HI" and a value of the input/output device externally attached to the image display section 20 can be represented as "HO".

A-3. Black-Boxing Processing

FIG. 6 is a flowchart for explaining a procedure of the black-boxing processing. The black-boxing processing is processing for converting the input/output devices of the HMD 100 into black boxes with respect to the various computer programs installed in the HMD 100. The black-boxing processing is executed by the main control section 300. In the black-boxing processing, the main control section 300 operates, according to a request received from a computer program installed in the HMD 100, the request designating functions required by the computer program, at least a part of input-output devices associated with the requested functions among the plurality of input/output devices connected to the HMD 100.

In step S100, the main control section 300 detects that the power supply of the HMD 100 is turned on. In step S102, the main control section 300 acquires the first device individual information 122 (FIG. 4) stored in the storing section 120. In step S104, the main control section 300 acquires the second device individual information 63 (FIG. 5) stored in the storing section 62.

In step S106, the main control section 300 groups the input/output devices for each of the functions. Specifically, the main control section 300 groups, using "function names", the first device individual information 122 (FIG. 4) acquired in step S102 and the second device individual information 63 (FIG. 5) acquired in step S104 (in other words, creates groups of entries having the same "function names") and causes the storing section 120 to store a result of the grouping as grouping individual information GI. The grouping individual information GI functions as "association". Note that the main control section 300 may carry out the grouping in this step only on the inside of the main control section 300. The storage in the storing section 120 may be omitted.

FIG. 7 shows an example of the grouping individual information GI. According to FIG. 7, it is seen that nine groups G1 to G9 are created by the grouping for each of the functions (step S106 in FIG. 6). For example, the group G1 is a group of input/output devices for realizing an "angular velocity acquisition" function. According to the group G1, it is seen that it is possible to realize the "angular velocity acquisition" function using a "gyro sensor" having a device ID "D2". Similarly, it is seen that it is also possible to realize the "angular velocity acquisition" function using a "camera" having a device ID "D3". For example, the group G6 is a group of input/output devices for realizing a "pointing operation" function. According to the group G6, it is seen that it is possible to realize the "pointing operation" function using a track pad having a device ID "D7". Similarly, it is seen that it is also possible to realize the "pointing operation" function using a mouse having a device ID "D8" or a cross key having a device ID "D9". Note that, in order to obtain angular velocity with the camera, first, feature points are extracted from images photographed over time for a plurality of times. Thereafter, it is possible to obtain the angular velocity by calculating an amount of change of the feature points and time required for the change (i.e., a photographing interval). Similarly, it is also possible to obtain acceleration with the camera.

In step S108 in FIG. 6, the main control section 300 converts the grouped functions into modules. Specifically, the main control section 300 generates, on the inside of the main control section 300, respective modules for each of the functions corresponding to the groups for each of the functions in the grouping individual information GI (FIG. 7). Note that, in step S108, the main control section 300 may allocate the input/output devices to modules generated in advance instead of generating the modules for each of the functions on the inside of the main control section 300.

FIG. 8 is an explanatory diagram for explaining a module. The "module" in this embodiment is software obtained by collectively converting one or more input/output devices for realizing predetermined functions into a component. The "module" is also software for causing, according to requests designating functions from the various computer programs installed in the HMD 100, at least a part of the input/output devices converted into the component. In FIG. 8, an angular-velocity acquisition module 301 for realizing the "angular velocity acquisition" function is exemplified and explained. The angular-velocity acquisition module 301 includes an individual-function control section 301a, a gyro-sensor driver 301b, and a camera driver 301c. The gyro-sensor driver 301b and the camera driver 301c indicated by broken lines can be used by storing the device ID of the gyro sensor and the device ID of the camera in the angular-velocity acquisition module 301 in step S110 of the black-boxing processing (FIG. 6).

When receiving a request designating a function from a computer program, the individual-function control section 301a operates the gyro sensor or the camera using one of the gyro-sensor driver 301b and the camera driver 301c and acquires a detection value by the gyro sensor or the camera. The individual-function control section 301a applies an arithmetic operation to the detection value according to necessity and returns an obtained value to the computer program at the request source as "angular velocity". As the "request designating the function", it is possible to adopt various forms such as a mathematical function including designation of a module (i.e., a function), a procedure including designation of a module (e.g., reference to a property), and a command including designation of a module. In the example shown in FIG. 8, a request by a mathematical function "getAV" is adopted. A portion "AV" of "getAV" is designation of the angular-velocity acquisition module 301, in other words, the angular-velocity acquisition function. Therefore, in the case of a different module, a different function such as "getAC" is adopted. In the example shown in FIG. 8, since nothing is designated in parentheses, there is no designation of an argument. However, an arithmetic operation content of the detection value by the individual-function control section 301a may be able to be designated by, for example, designation of an argument. In this way, according to the example shown in FIG. 8, it is possible to access the angular-velocity acquisition module 301 and acquire angular velocity from any program installed in the HMD 100 using a common format "getAV".

FIG. 9 shows an example of functions converted into modules. According to FIG. 9, it is seen that modules respectively corresponding to the nine groups in the grouping individual information GI (FIG. 7) are created on the inside of the main control section 300. For example, the angular-velocity acquisition module 301 is a module (software) corresponding to the "angular velocity acquisition" function of the group G1. An acceleration acquisition module 302 is a module (software) corresponding to the "acceleration acquisition" function of the group G2. Note that the configurations and the functions of the modules are the same as those in the explanation in FIG. 8.

In step S110 in FIG. 6, the main control section 300 allocates input/output devices to the modules. Specifically, the main control section 300 causes, on the basis of the grouping individual information GI (FIG. 7), the modules created by the modularization for each of the functions (step S108 in FIG. 6) to store "device IDs" and "intra-module device IDs" of input/output devices capable of realizing the functions. When there are a plurality of input/output devices capable of realizing one function, the main control section 300 causes the modules to store device IDs and module IDs of all of the input/output devices. By causing the modules to store the device IDs and the module IDs, the modules are capable of using the input/output devices via drivers of the input/output devices (FIG. 8). For example, the main control section 300 causes the angular-velocity acquisition module 301 to store a device ID "D2" and an intra-module device ID "SG1" of a "gyro sensor" capable of realizing the "angular velocity acquisition" function and a device ID "D3" and an intra-module device ID "SG2" of a "camera" capable of realizing the "angular velocity acquisition" function. Note that, when there is only one input/output device capable of realizing a predetermined function, the storage of the intra-module device ID may be omitted.

In step S112, the main control section 300 selects one input/output device operated in the modules. The main control section 300 can select, according to any one of references a1 to a5 exemplified below, input/output device operated in the modules. The references a1 to a5 may be used alone or may be used in combination. Different references may be used (alone or in combination) for each of the modules.

(a1) A degree of relevance between a "type" of information concerning a function and a "type" of information concerning an input/output device in the grouping individual information GI is set as a reference. The degree of relevance can be calculated using data comparison such as character string comparison. For example, when the "type" of the information concerning the function is a "sensor", the main control section 300 preferentially selects an input/output device, the "type" of the information concerning the input/output device of which is a "XXX sensor". Note that "X" is any character string. If this reference is used, the main control section 300 can select an input/output device operated in the modules on the basis of the degree of relevance between the type of the function and the type of the input/output device stored in the device individual information (the first device individual information 122 and the second device individual information 63). As a result, the main control section 300 can select an input/output device having relevance to a type of a function required by a computer program.

(a2) The accuracy of an input/output device is set as a reference. For example, the main control section 300 preferentially selects an input/output device having higher accuracy of the input/output device. The "accuracy" can include all kinds of performance concerning accuracy such as detection accuracy, operation accuracy, arithmetic operation accuracy, drawing accuracy, acquisition accuracy, and reproduction accuracy by the input/output device. The main control section 300 can acquire the "accuracy" of the input/output device by inquiring a device driver of the input/output device about the "accuracy". Note that, when this reference is adopted, an "accuracy" field for storing the accuracy of the input/output device maybe provided in the first device individual information 122 and the second device individual information 63. If this reference is used, the main control section 300 can select an input/output device on the basis of the accuracy of the input/output device. Therefor, the main control section 300 can select an input/output device having higher accuracy.

(a3) The speed of an input/output device is set as a reference. For example, the main control section 300 preferentially selects an input/output device having higher speed of the input/output device. The "speed" can include all kinds of performance concerning speed such as start speed, detection speed, operation speed, arithmetic operation speed, drawing speed, acquisition speed, and reproduction speed of the input/output device. The main control section 300 can acquire the "speed" of the input/output device by inquiring a device driver of the input/output device about the "speed". The main control section 300 may acquire the "speed" of the input/output device according to a benchmark (processing for issuing a provisional command and measuring processing speed). The benchmark may be executed at any timing, for example, when the power supply of the HMD 100 is turned on or when the input/output device is detected. Note that, when this reference is adopted, a "speed" field for storing the speed of the input/output device may be provided in the first device individual information 122 and the second device individual information 63. If this reference is used, the main control section 300 can select an input/output device on the basis of the speed of the input/output device. Therefore, the main control section 300 can select an input/output device having higher speed.

(a4) Priority decided in advance by the user of the HMD 100 is set as a reference. For example, the main control section 300 may show candidates of all usable input/output devices to the user for each of functions and receive an input of priority by the user. The main control section 300 may present an initial value of the priority to the user on the basis of frequencies of use of the input/output devices for each of the functions in the past. If this reference is used, the main control section 300 can select an input/output device on the basis of the priority decided by the user in advance. Therefore, the main control section 300 can select an input/output device that matches the preference of the user.

(a5) Information concerning a position where an input/output device is disposed in the HMD 100 is set as a reference. For example, the main control section 300 preferentially selects an input/output device disposed in the control section 10. The main control section 300 may preferentially select an input/output device disposed in the image display section 20. As a result, the main control section 300 can select an input/output device having higher relevance to a type of a function required by a computer program.

Note that the accuracy of the input/output device of the reference a2 and the speed of the input/output device of the reference a3 are collectively referred to as "performance of the input/output device" as well. The performance of the input/output device may include indicators other than the accuracy and the speed such as the number of pixels in driving the LCD or the camera.

FIG. 10 shows a state in which one input/output device operated in the modules is selected. In FIG. 10, input/output devices with hatching indicate selected input/output devices. Input/output devices without hatching indicate unselected input/output devices. According to an example shown in FIG. 10, it is seen that, in the module corresponding to the "angular velocity acquisition" function of the group G1 (the angular-velocity acquisition module 301), a "gyro sensor" having a device ID "D2" and an intra-module device ID "SG1" is selected. It is seen that, in the module corresponding to the "acceleration acquisition" function of the group G2 (the acceleration acquisition module 302), an "acceleration sensor" having a device ID "D4" and an intra-module device ID "SA1" is selected.

In step S114 in FIG. 6, the main control section 300 receives requests from the various computer programs installed in the HMD 100. The "request" means the request (the mathematical function, the procedure, the command, etc.) designating the function explained in FIG. 8. The main control section 300 operates, according to a request from a computer program, the individual-function control section 301*a* of a module designated by the request. The individual-function control section 301*a* operates the input/output device selected in step S112. Specifically, when the device selected in step S112 is an input device, the individual-function control section 301*a* acquires a detection value of the input device, calculates the detection value, and returns an obtained value (angular velocity, etc.) to the computer program at the request source as a return value. When the device selected in step S112 is an output device, the individual-function control section 301*a* drives the output device (e.g., in the image display module 305, driving of the LCD). In this case, the return of the return value may be omitted. In this way, the operation of the individual-function control section 301*a* and the presence or absence of the argument and the return value are different depending on characteristics of the input/output devices controlled by the modules. Thereafter, the main control section 300 continues to stand by for a request from a computer program.

As explained above, according to the black-boxing processing in the embodiment (FIG. 6), the main control section 300 operates, according to requests designating functions (i.e., requests designating functions such as the mathematical function, the procedure, and the command) received from the various computer programs installed in the HMD 100, at least a part of input/output devices associated with the designated functions among the plurality of input/output devices. Specifically, the main control section 300 performs the association of the functions and the input/output devices by grouping the plurality of input/output devices for each of the functions required by the computer programs (step S106). The main control section 300 operates, according to the request designating the function received from the computer program, the input/output device grouped by the function designated in the request and selected in the group (step S112) (step S114). Therefore, the main control section 300 can allocate the plurality of input/output devices to one function required by the computer program and operate only a part of the allocated input/output devices. Consequently, a program developer does not need to be aware of a type of an input/output device used in creation of a computer program and only has to include a request designating a "function" desired to be used. As a result, in program development for the information processing device (the HMD 100), it is possible to realize program development in which the program developer does not need to be aware of a type of an input/output device to be used.

According to the black-boxing processing in the embodiment (FIG. 6), the main control section 300 can easily carryout the grouping of the input/output devices for each of the functions using the device individual information (the first device individual information 122 and the second device individual information 63) in which the "function names" representing the contents of the functions required by the computer programs installed in the HMD 100 and the "types" of the input/output devices connected to the HMD 100 are stored in association with each other.

Further, according to the black-boxing processing in the embodiment (FIG. 6), the main control section 300 can operate the input/output devices according to the request by at least one of the function, the procedure, and the command, which are means generally used in the computer programs. As a result, it is possible to improve convenience in the program developer.

A-4. Modification of the Black-Boxing Processing

The black-boxing processing explained above may be modified as explained below. Modifications explained below may be applied alone or may be applied in combination.

A-4-1. Modification 1

In a modification 1, the main control section 300 selects two or more input/output devices to improve availability of the information processing device.

In step S112 in FIG. 6, the main control section 300 selects two or more input/output devices operated in the modules. The main control section 300 assigns priority levels to the selected two or more input/output devices to indicate that, for example, an input/output device having the highest priority level is a gyro sensor and an input/output device having the second highest priority level is a camera.

In step S114, the main control section 300 operates the input/output device having the highest priority level in the module designated by the request from the computer program installed in the HMD 100. When detecting abnormality in the behavior of the operated input/output device, the main control section 300 operates the input/output device having the second highest priority level in the module. The abnormality is detected in the behavior, for example, when a detection value by the input/output device is an normally impossible value, a response from the input/output device is not received for a predetermined time, or when an error response is received from the input/output device. Note that, when three or more input/output devices are selected, the same processing only has to be repeated.

According to the modification 1, the main control section 300 selects the two or more input/output devices from each of the groups in step S106 and, first, operates, according to the request designating the function received from the computer program, the input/output device grouped by the function designated in the request and having the highest priority order in the group. When the input/output device operated first has abnormality, the main control section 300 operates the input/output device having the second highest priority level in the group. Therefore, even when a certain input/output device has abnormality, the main control section 300 can respond to the request from the computer program using another input/output device. As a result, it is possible to improve availability of the information processing device (the HMD 100).

Note that, in the modification 1, the priority levels can be assigned to the input/output devices at any timing. For example, the main control section 300 may assign the priority levels to the grouped input/output devices at the point of the grouping in step S106. In this case, in step S112, the main control section 300 only has to select the input/output devices operated in the modules.

A-4-2. Modification 2

In the modification 2, the main control section 300 also sets input/output devices included in another information processing device connected to the HMD 100 as a target of the black-boxing processing.

In Step S100 in FIG. 6, the main control section 300 detects that the power supply of the HMD 100 is turned on and attempts to detect another information processing device connected to the HMD 100. Note that, as the other information processing device, any devices such as an HMD, a smartphone, and a personal computer can be adopted. Connection between the HMD 100 and the other information processing device may be wireless connection such as a wireless LAN or short-range wireless communication or may be wired connection.

When detecting the connection of the other information processing device, in Step S104, the main control section 300 also acquires information concerning input/output devices connected to the other information processing device. In step S106, the main control section 300 groups the first device individual information, the second device individual information, and the information concerning the input/output devices connected to the other information processing device. The following steps S108 to S144 are as explained in the embodiment.

Note that, in the modification 2, when the main control section 300 of the HMD 100 detects the other information processing device connected to the HMD 100 and when a functional section equivalent to the main control section 300 (hereinafter referred to as "main control section of the other information processing device" as well) is present in the other information processing device, the main control section 300 may carry out processing explained below after detecting the connection of both the devices.

Between Step S100 and Step S102 in FIG. 6, the main control section 300 of the HMD 100 determines a master-slave relation between the main control section 300 and the main control section of the other information processing device. The main control section functioning as the master executes, in parallel, the black-boxing processing for the computer programs installed in the HMD 100 and the black-boxing processing for computer programs installed in the other information processing device.

The main control section 300 of the HMD 100 and the main control section of the other information processing device respectively individually execute the black-boxing processing. In this case, in Step S114 in FIG. 6, the main control section 300 of the HMD 100 receives a request from a computer program installed in the HMD 100 and the main control section of the other information processing device receives a request from a computer program installed in the other information processing device.

According to the modification 2, the main control section 300 can select, in addition to the input/output devices connected to the information processing device (the HMD 100), the input/output devices included in (connected to) the other information processing device connected to the information processing device and operate the input/output devices according to requests designating functions received from the computer programs.

B. Modifications

In the embodiment, a part of the components realized by hardware may be replaced with software. Conversely, a part of the components realized by software may be replaced with hardware. Besides, modifications explained below are also possible.

Modification 1:

In the embodiment, the configuration of the HMD is exemplified. However, the configuration of the HMD can be arbitrarily set without departing from the spirit of the invention. For example, addition, deletion, conversion, and the like of the components can be performed.

The allocation of the components to the control section and the image display section in the embodiment is only an example. Various forms of the allocation can be adopted. For example, the following forms of the allocation may be adopted: (i) a form in which processing functions such as a CPU and a memory are mounted on the control section and only a display function is mounted on the image display section, (ii) a form in which the processing functions such as a CPU and a memory are mounted on both of the control section and the image display section, (iii) a form in which the control section and the image display section are integrated (e.g., a form in which the control section is included in the image display section and functions as an eyeglass-type wearable computer), (iv) a form in which a smart phone or a portable game machine is used instead of the control section, and (v) a form in which the control section and the image display section are connected by connection via a wireless signal transmission line such as the wireless LAN, the infrared communication, or the Bluetooth and the connecting section (the cord) is eliminated. Note that, in this case, power supply to the control section or the image display section may be carried out wirelessly.

For example, the configurations of the control section and the image display section exemplified in the embodiment can be arbitrarily changed. Specifically, for example, in the embodiment, the control section includes the transmitting section and the image display section includes the receiving section. However, both of the transmitting section and the receiving section may include a function capable of performing bidirectional communication and function as a transmitting/receiving section. For example, a part of the interfaces for operation (the various keys, the track pads, etc.) included in the control section may be omitted. An interface for operation such as a stick for operation may be included in the control section. Devices such as a keyboard and a mouse may be connectable to the control section. The control section may receive inputs from the keyboard and the mouse. For example, in the embodiment, the secondary battery is used as the power supply. However, the power supply is not limited to the secondary battery. Various batteries can be used as the power supply. For example, a primary battery, a fuel battery, a solar battery, and a thermal battery may be used.

FIGS. 11A and 11B are explanatory diagrams showing exterior configurations of HMDs in the modification. In an example shown in FIG. 11A, an image display section 20x includes a right optical-image display section 26x instead of the right optical-image display section 26 and includes a left optical-image display section 28x instead of the left optical-image display section 28. The right optical-image display section 26x and the left optical-image display section 28x are formed smaller than the optical members in the embodiment and respectively disposed obliquely above the right eye and the left eye of the user during wearing of the HMD. In an example shown in FIG. 11B, an image display section 20y includes a right optical-image display section 26y instead of the right optical-image display section 26 and includes a left optical-image display section 28y instead of the left optical-image display section 28. The right optical-image display section 26y and the left optical-image display section 28y are formed smaller than the optical members in the embodiment and respectively disposed obliquely below the right eye and the left eye of the user during wearing of the HMD. In this way, the optical-image display sections only have to be disposed near the eyes of the user. The size of the optical members forming the optical-image display sections is arbitrary. The HMD can also be realized as a head mounted display of a form in which the optical-image display sections cover only a part of the eyes of the user, in other words, a form in which the optical-image display sections do not completely cover the eyes of the user.

In the embodiment, for example, the processing sections (e.g., the image processing section, the display control section, and the main control section) included in the control section are described as being realized by the CPU expanding the computer program, which is stored in the ROM or the hard disk, on the RAM and executing the computer program. However, these functional sections may be configured using ASICs (Application Specific Integrated Circuits) designed to realize the functions of the functional sections. The processing sections may be disposed in the image display section rather than the control section.

In the embodiment, for example, the HMD is the transmission-type HMD of a binocular type. However, the HMD may be a HMD of a monocular type. The HMD may be configured as a non-transmission-type HMD in which transmission of an outside scene is blocked in a state in which the user wears the HMD or may be configured as a video see-through in which a camera is mounted on the non-transmission type HMD. For example, as the image display section, instead of the image display section worn like eyeglasses, a normal flat display device (a liquid crystal display device, a plasma display device, an organic EL display device, etc.) may be adopted. In this case, the connection between the control section and the image display section may be connection via a wired signal transmission line or may be connection via a wireless signal transmission line. Consequently, the control section can be used as a remote controller of the normal flat display device. For example, as the image display section, instead of the image display section worn like eyeglasses, image display sections of other shapes such as an image display section of a type worn like a hat may be adopted. As the earphones, earphones of an ear hook type and a headband type may be adopted. The earphones may be omitted. The HMD may be configured as, for example, a head-up display (HUD) mounted on vehicles such as an automobile and an airplane and other means of transportation. For example, the HMD may be configured as an HMD incorporated in a body protector such as a helmet. For example, the HMD may be configured as a hand held display.

For example, in the embodiment, the image-light generating sections are configured using the backlights, the backlight control sections, the LCDs, and the LCD control sections. However, the form is only an example. The image-light generating sections may include components for realizing other systems in addition to or instead of these components. For example, the image-light generating sections may include displays of organic EL (Electro-Luminescence) and organic EL control sections. For example, in the image generating sections, digital micro-mirror devices or the like can also be used instead of the LCDs. For example, the invention can also be applied to a head mounted display device of a laser retinal projection type.

Modification 2:

In the embodiment, the configuration of the module generated by the main control section is exemplified. However, the configuration of the module can be optionally decided without departing from the spirit of the invention. For example, addition, deletion, conversion, and the like of the components can be performed.

For example, the main control section may generate one module including sub-modules for each of the functions. In this case, for example, the "designation of functions" from the computer program may be realized using an argument of a mathematical function. Specifically, the computer program may adopt a request by a mathematical function "get (av)" when an angular-velocity acquisition sub-module is used and may adopt a request by a mathematical function "get (ac)" when an acceleration acquisition sub-module is used.

For example, the modules and the sub-modules may be implemented as a library program.

Modification 3:

In the embodiment, an example of the black-boxing processing is explained. However, the procedure of the processing explained in the embodiment is only an example. Various modifications of the procedure are possible. For example, a part of the steps may be omitted. Other steps may be added. The order of the steps to be executed may be changed.

For example, in steps S102 and S104, the main control section acquires the first device individual information and the second device individual information. However, the main control section may automatically generate these kinds of device individual information instead of acquiring the information. For example, when detecting the connection of the input/output device to the HMD, the main control section can automatically generate the device individual information by acquiring information concerning the input/output device. In the generation of the device individual information, for example, in order to acquire other information (e.g., a type) of the input/output device from certain information (e.g., a model number) of the input/output device, the main control section may be connected to the outside (e.g., a server on the Internet).

For example, in Step S106, the main control section may set, as the target of the grouping, only an input/output device that is currently connected to the HMD and in an active state in which the input/output device can be used within a predetermined time. Consequently, it is possible to suppress the processing from being delayed as a result of selection of an input/output device that requires the predetermined time or more to become usable. The predetermined time can be optionally decided. However, in order to suppress the processing delay, the predetermined time desirably set to a short time such as 3 seconds or less.

For example, when detecting connection of a new input/output device to the HMD, the main control section may execute the processing in steps S102 to S114 again. Consequently, it is possible to execute the black-boxing processing in a plug-and-play system.

For example, when receiving designation from the user, the main control section can change, according to the designation by the user, the input/output device selected in Step S112. As the designation by the user, a system for knocking the vicinity of an input/output device desired to be used may be adopted. For example, a system for causing the user to select an input/output device from a setting screen of the HMD may be adopted. A system for performing voice recognition of a name of an input/output device desired to be used may be adopted.

For example, when there is no module corresponding to a function designated in a request received from the computer program in the embodiment or when abnormality is detected in behaviors in all of the selected plurality of input/output devices, the main control section may perform display and notification for informing the user of the HMD to that effect. In this case, the computer program at the request source may advance the processing without using the designated function.

Modification 4:

The invention is not limited to the embodiment, the examples, and the modifications and can be realized in various configurations without departing from the spirit of the invention. For example, the technical features of the embodiment, the examples, and the modifications corresponding to the technical features in the aspects described in the summary of the invention can be replaced or combined as appropriate in order to solve a part or all of the problems or in order to achieve a part or all of the effects. Unless the technical features are explained as essential features in this specification, the technical features can be deleted as appropriate.

REFERENCE SIGN LIST

10: control section
11: determination key
12: lighting section
13: display switching key
14: track pad
15: luminance switching key
16: direction key
17: menu key
18: power switch
20: image display section
21: right holding section
22: right display driving section
23: left holding section
24: left display driving section
26: right optical-image display section
28: left optical-image display section
30: earphone plug
32: right earphone
34: left earphone
40: connecting section
42: right cord
44: left cord
46: coupling member
48: main body cord
51: transmitting section
52: transmitting section
53: receiving section
54: receiving section
61: camera
62: storing section
63: second device individual information (device individual information)
66: nine-axis sensor
110: input-information acquiring section
100: HMD (information processing device)
120: storing section
122: first device individual information (device individual information)
130: power supply
132: wireless communication section
140: CPU
160: image processing section 170: sound processing section
180: interface
190: display control section
201: right backlight control section
202: left backlight control section
211: right LCD control section
212: left LCD control section
221: right backlight
222: left backlight
241: right LCD
242: left LCD
251: right projection optical system
252: left projection optical system
261: right light guide plate
262: left light guide plate
300: main control section
301: angular-velocity acquisition module
301a: individual-function control section
301b: gyro-sensor driver
301c: camera driver
302: acceleration acquisition module
303: azimuth acquisition module
304: image acquisition module
305: image display module
306: pointing operation module
307: cross key operation module
308: mute operation module
309: sound-volume operation module
PCLK: clock signal
VSync: vertical synchronization signal
HSync: horizontal synchronization signal
Data: image data
Data1: image data for right eye
Data2: image data for left eye
OA: external apparatus
PC: personal computer
SC: outside scene
VI: virtual image
VR: visual field
RE: right eye
LE: left eye
ER: end portion
EL: end portion

The invention claimed is:
1. An information processing device comprising:
a plurality of input/output devices for use by a computer program for executing any processing; and
a processor programmed to: processor
receive a request from the computer program, the request designating at least one function required by the computer program;
determine a grouping of input/output devices from the plurality of input/output devices based on the designated at least one function;
assign a priority level to each input/output device in the grouping;
operate and retrieve information from the input/output device having the highest priority level in the grouping; and
transmit the retrieved information to the computer program.
2. The information processing device according to claim 1, wherein the processor is further programmed to:
perform the association by grouping the plurality of input/output devices for each of the functions required by the computer program,
select at least one of the input/output devices from each of groups on the basis of a predetermined reference, and
operate, according to the request, the input/output devices selected in the group.
3. The information processing device according to claim 1, wherein the request designating the functions is at least any one of a mathematical function including the designation of the functions, a procedure including the designation of the functions, and a command including the designation of the functions.
4. The information processing device according to claim 2, wherein
when the operated input/output device has abnormality, operates the input/output device having a second highest priority level in the group.
5. The information processing device according to claim 2, wherein the processor executes the selection and the operation after grouping, for each of the functions required by the computer program, a plurality of input/output devices included in another information processing device connected to the information processing device together with the plurality of input/output devices of the information processing device to perform the association.
6. The information processing device according to claim 2, wherein the processor limits a target of the grouping to the input/output devices that are in an active state.
7. The information processing device according to claim 2, further comprising
a memory storing:
device individual information in which information concerning the input/output devices connected to the information processing device is stored,
a plurality of function names representing contents of the functions, and
types of the input/output devices being stored in the device individual information in association with each other, wherein
the processor acquires the device individual information and carries out the grouping using the function names of the acquired device individual information.
8. The information processing device according to claim 7, wherein
in the device individual information, types of the functions and information concerning positions where the input/output devices present in the information processing device are stored in association with the function names, and
the processor carries out the selection on the basis of at least one of:
a degree of relevance between the types of the functions stored in the device individual information and the types of the input/output devices,
performance of the input/output devices,
priority decided in advance by a user of the information processing device, and
the information concerning the positions.
9. A method of controlling an information processing device, the method comprising:
receiving a request from a computer program, the request designating at least one function required by the computer program;
determining a grouping of input/output devices from a plurality of input/output devices that are present in the information processing device based on the designated at least one function;
assigning a priority level to each input/output device in the grouping;

operating and retrieving information from the input/output device having a highest priority level in the grouping; and transmitting the retrieved information to the computer program.

10. A non-transitory computer readable medium storing a computer program that causes a computer to perform steps comprising:

receiving a request from a computer program, the request designating at least one function required by the computer program;

determining a grouping of input/output devices from a plurality of input/output devices that are present in an information processing device based on the designated at least one function;

assigning a priority level to each input/output device in the grouping;

operating and retrieving information from the input/output device having a highest priority level in the grouping; and transmitting the retrieved information to the computer program.

\* \* \* \* \*